(12) United States Patent
Adams et al.

(10) Patent No.: US 9,163,499 B2
(45) Date of Patent: Oct. 20, 2015

(54) METHOD OF DETERMINING RESERVOIR PRESSURE

(75) Inventors: John R. Adams, Katy, TX (US);
Siyavash Motealleh, Houston, TX (US);
Herbert M. Sebastian, Cypress, TX (US); Yuanlin Jiang, Katy, TX (US);
Bryan Dotson, Houston, TX (US)

(73) Assignee: BP Corporation North America Inc., Houston, TN (US)

( * ) Notice: Subject to any disclaimer, the term of this patent is extended or adjusted under 35 U.S.C. 154(b) by 849 days.

(21) Appl. No.: 13/327,182

(22) Filed: Dec. 15, 2011

(65) Prior Publication Data

US 2012/0158310 A1    Jun. 21, 2012

Related U.S. Application Data

(60) Provisional application No. 61/423,692, filed on Dec. 16, 2010.

(51) Int. Cl.
*E21B 47/06* (2012.01)
*G01V 9/02* (2006.01)
*E21B 49/08* (2006.01)
*E21B 49/00* (2006.01)

(52) U.S. Cl.
CPC .............. *E21B 47/06* (2013.01); *E21B 49/008* (2013.01); *E21B 49/003* (2013.01); *E21B 2049/085* (2013.01); *G01V 9/02* (2013.01)

(58) Field of Classification Search
CPC . G06F 19/00; G06F 19/3481; G06F 17/5009; G06F 17/40; G06F 17/5081; E21B 49/003; E21B 49/008; E21B 2049/085; E21B 47/06; G01V 9/02
USPC ..................................................... 702/12, 13
See application file for complete search history.

(56) References Cited

U.S. PATENT DOCUMENTS

2009/0276156 A1    11/2009   Kragas et al.
2011/0098931 A1*    4/2011   Kosmala et al. ................ 702/12

OTHER PUBLICATIONS

US EIA report, "Annual Energy Outlook 2011 with Projections to 2035", http://www.eia.doe.gov/oiaf/aeo/assumption/pdf/tbl9.2.pdf, DOE/EIA-0383, Apr. 2011, p. 117.

(Continued)

*Primary Examiner* — John Breene
*Assistant Examiner* — Lynda Dinh
(74) *Attorney, Agent, or Firm* — Gunnar Heinisch (57) ABSTRACT

A new approach is disclosed for measuring the pressure of tight gas reservoirs, using information obtain from continuous injection prior to hydraulic fracture stimulation. The technique can be obtained utilizing either bottom-hole or surface pressure gauges and properly instrumented surface injection pumps. The analysis is completed by plotting injection and rate data in a specialized form from terms arranged in Darcy's radial flow equation to obtain a curve or trend. The key component to proper application of this technique is to obtain both baseline and one or more calibration data sets. These calibration data sets are obtained by either increasing or decreasing the injection pressure and/or rate from the baseline data. Initial reservoir pressure is assumed, but the calibration data indicates if the guess was too high or low. Accurate estimates of reservoir pressure may be obtained in a few iterations.

22 Claims, 10 Drawing Sheets

(56) References Cited

OTHER PUBLICATIONS

PCT Search Report and Written Opinion of the International Searching Authority, or the Declaration, issued in International application No. PCT/US2011/065258, mailed Jun. 11, 2013, 13 pages.

Shie-Way Wang: "Application of Radial Flow Theory and PLT Surveys to Determine Reservoir Pressure and Wellbore Conditions for Gas Reservoirs", SPE Annual Technical Conference and Exhibition, Oct. 1-4, 2000, pp. 1-11, XP055062762, Texas, Dallas, USA.

* cited by examiner

10Kh, 600dp, 3SIT, 4hr, 0.5d

METHOD OF DETERMINING RESERVOIR PRESSURE

CROSS-REFERENCE TO RELATED APPLICATIONS

This application claims the benefit of U.S. Provisional Application Ser. No. 61/423,692, filed Dec. 16, 2010, and is incorporated herein by reference in its entirety for all purposes.

STATEMENT REGARDING FEDERALLY SPONSORED RESEARCH OR DEVELOPMENT

Not applicable.

BACKGROUND

1. Field of the Invention

This invention relates generally to the field of exploration and production of hydrocarbons. More specifically, the invention relates to a method of determining reservoir pressure in hydrocarbon reservoirs.

2. Background of the Invention

Increasingly, hydrocarbon resource is being developed in low permeability reservoirs. For example, more than 50%) of the currently identified gas resources in the United States is found within tight gas and shale gas reservoirs (ref. Table 9.2 of the US EIA report titled "Assumptions to Annual Energy Outlook 2011" http://38.96.246.204/forecasts/aeo/assumptions/pdf/0554(2011).pdf). Estimation of reservoir pressure in tight gas, shale gas and tight oil reservoirs is important for variety of reasons including estimates for ultimate recovery, production forecasting and optimization of depletion planning. Completion designs, modeling studies and future field development decisions are all improved with better knowledge of current and historical reservoir pressures. However, reservoir pressure is difficult to determine in low permeability reservoirs using current well testing methods due to the long shut-in times required for the well test to obtain a reliable estimate of reservoir pressure. Injection testing during the completion phase performed prior to hydraulic fracturing in many cases has proven effective in determining reservoir pressures in low permeability reservoirs. These types of tests become less economically attractive to run if reservoir conditions are such that the fluid level within the wellbore drops below surface resulting in the well going on vacuum before sufficient data has had time to be collected. Running downhole pressure gauges is often not economically practical. In addition, as the permeability decreases, the monitoring time required increases, introducing a significant delay in the well completion. Obtaining reservoir pressure in a more economical manner has value in a number of ways. In marginally economic developments, it may present the only way to directly measure reservoir pressure. Mini falloff tests (MFoT) are the current accepted industry practice to obtain estimates of reservoir pressure in low permeability reservoirs. While MFoTs are generally conducted prior to hydraulic fracture treatments the time to obtain analyzable data could still require several days thus limiting the application of this method on a wide scale basis. The main reasons for this are wellbore storage and the need to obtain pseudo radial flow. Having a method where wellbore storage and obtaining radial flow were not limiting factors would greatly enhance the ability to obtain estimates of reservoir pressure. Should an MFoT be performed, having a prior independent estimate of reservoir pressure would allow for both a confirmation of reservoir pressure and improvements in permeability height estimates. If reservoir pressure and permeability are known then during production, rate transient analysis (RTA) can be more accurately applied to estimate fracture length and conductivity, thus allowing for improved understanding of completion efficiencies. Utilizing test results to establish relationships between reservoir pressure (pore pressure) and fracture and/or closure pressures within specific reservoir intervals, could potentially allow for using historically recorded fracture and/or closure pressures to provide estimates of historical field wide depletion. Documented results utilizing Eaton's correlation shows that comparing measured pore pressure to fracture and/or closure pressure could result in establishing trend lines for specific reservoirs. Applying previously documented fracture and/or closure pressures to these trend line relationships would yield estimated reservoir pressure at the time of each of the prior fracture simulations, thus providing estimates of historical fieldwide depletion. Establishing and utilizing these trend lines then could greatly leverage the test results far beyond the limited amount of actual test data actually measured. To have confidence in these trend lines a statistically meaningful set of measures reservoirs pressures must be taken.

Consequently, there is a need for an improved low-cost and accurate method of determining reservoir pressure in low permeability reservoir systems.

BRIEF SUMMARY

These and other needs in the art are addressed in one embodiment by a method of determining reservoir pressure in a gas well. Embodiments of the method have application in different type of gas reservoirs, but are primarily targeted for use in tight gas and shale reservoirs (e.g. low permeability gas reservoir systems). It is however recognized that the method also may be used in conventional reservoirs (both gas and oil), tight oil, shale oil and coalbed methane reservoirs. In an embodiment, the method initially includes performing a series of injection events with discrete stages, determining the rate and pressure at the sandface to generate one or more pairs of baseline and calibration trends. The technique may be implemented utilizing either bottom-hole gauges, surface gauges or level gauges with properly designed and instrumented surface or downhole injection pumps. The baseline and calibration trends match at a particular value of reservoir pressure, generating a distinguishable estimate of reservoir pressure. When more than one pair is generated, the method provides information that may be used to correct for the supercharging of the porous media next to the well imposed by the injection test.

In an embodiment, the method for estimating reservoir pressure may be applied to a new isolated set of perforations that have had little or no production. A small amount of fluid may injected to ensure perforations are open, but careful measurement of volumes pumped and injection rates/volumes are limited to minimize the creation of any hydraulic fracture length during the test. Several different methods of injecting fluid and acquiring the datasets may be utilized. In all embodiments, a discrete shift in either rate or pressure or both is imposed to generate a baseline and calibration trend pair. Bottom hole injection pressure and injection rates at the sandface are obtained for one or more pairs of baseline and calibration trends. The number of baseline and calibration pairs is one less than the number of stages generated.

In an embodiment, a method of determining reservoir pressure from a reservoir comprises injecting a fluid into a well drilled into the reservoir. The method comprises measuring one or more parameters indicative of reservoir pressure over a period time to form a baseline dataset, wherein the one or more parameters include at least bottom hole pressure and volumetric flow rate. The method also comprises inducing a change in the injection rate or injection pressure of the fluid. In addition, the method comprises measuring the one or more parameters indicative of reservoir pressure for at least a second period of time to form a calibration dataset. The method further comprises estimating a reservoir pressure value. The method additionally comprises plotting the baseline dataset and the calibration datasets to form a baseline curve and calibration curve based upon the reservoir pressure value, and comparing the baseline curve and the calibration curve to determine if the reservoir pressure value is correct. If the baseline curve and the calibration curve are not aligned, then repeating the estimation and plotting until the baseline curve and the calibration curve are aligned.

In another embodiment, a method of determining reservoir pressure from a reservoir comprises injecting a fluid into the reservoir at a first rate or first pressure to measure one or more parameters indicative of reservoir pressure over a first time period to form a baseline dataset. The method also comprises injecting the fluid in the reservoir at a different rate or different pressure than the first rate or first pressure to measure one or more parameters indicative of reservoir pressure over a time period to form one or more calibration datasets. In addition, the method comprises using a form of Darcy's flow equation to compare the baseline datasets and the one or more calibration datasets to determine reservoir pressure.

In an embodiment, a system for determining reservoir pressure comprises one or more sensors positioned to measure one or more parameters indicative of reservoir pressure from a hydrocarbon producing reservoir. The one or more parameters include at least bottom hole pressure and volumetric flow rate. The system includes an interface coupled to one or more sensors for receiving the one or more parameters from the one or more sensors. In addition, the system comprises a memory resource, an input and output functions for presenting and receiving communication signals to and from a human user, one or more central processing units for executing program instructions, and program memory coupled to the central processing unit for storing a computer program including program instructions that when executed by the one or more central processing units cause the computer system to perform a plurality of operations for determining reservoir pressure. The plurality of operations comprises forming a baseline dataset based on the one or more parameters. The operations also comprise forming one or more calibration datasets based on the one or more parameters. Moreover, the operations comprise estimating a reservoir pressure value. The operations additionally comprise plotting the baseline dataset and the calibration datasets to form a baseline curve and calibration curve based upon the reservoir pressure value. Furthermore, the operations comprise comparing the baseline curve and the calibration curve to determine if the reservoir pressure value is correct and if the baseline curve and the calibration curve are not aligned, then repeating (c) through (e) until the baseline curve and the calibration curve are aligned.

The foregoing has outlined rather broadly the features and technical advantages of the invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

DETAILED DESCRIPTION OF THE PREFERRED EMBODIMENTS

Figure 1:
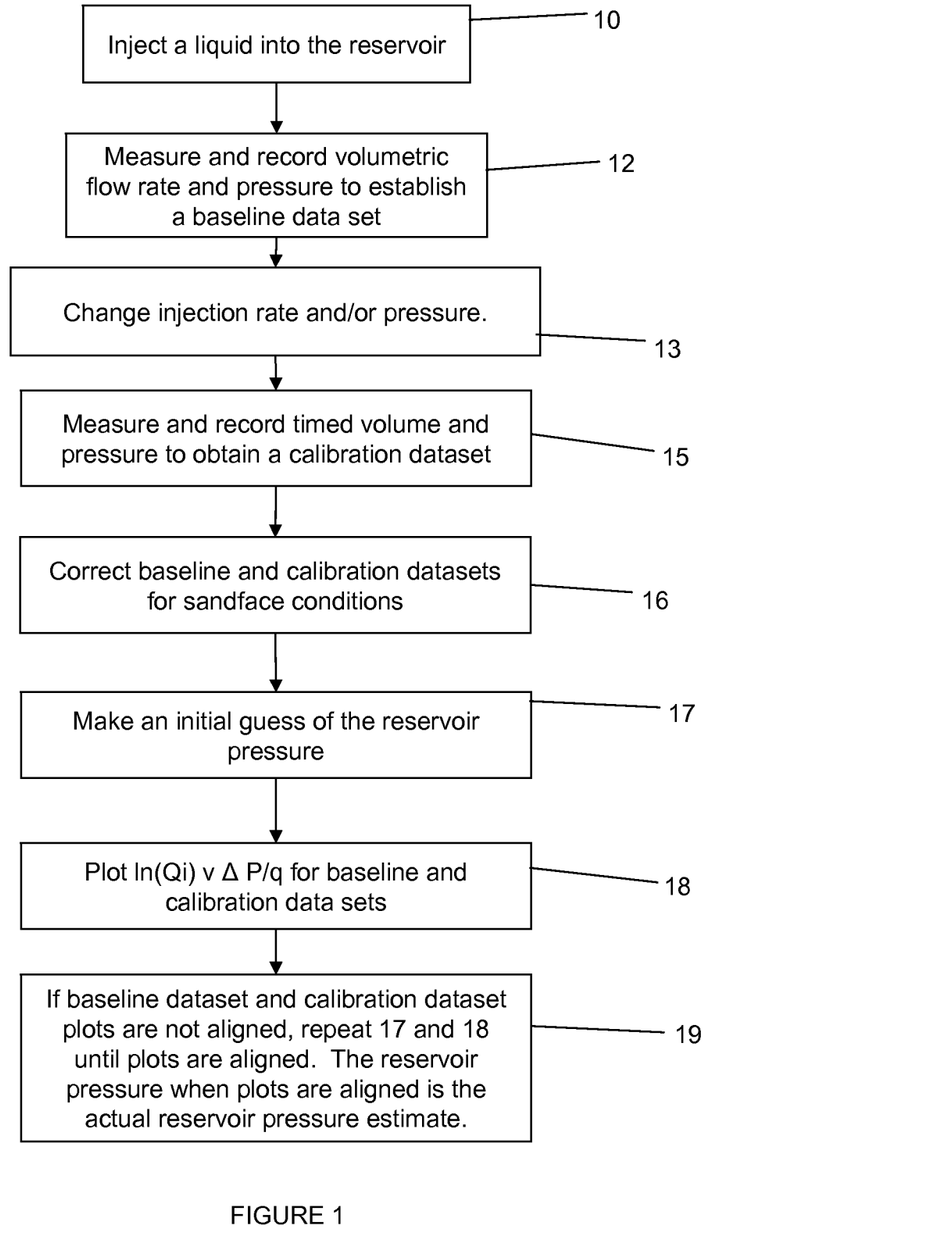
FIG. 1 illustrates a flowchart of an embodiment of the method.

FIG. 1 is a flowchart depicting an embodiment of a method for determining reservoir pressure. In an embodiment, the method preferably is applied to wells with a new isolated set of perforations 118 in a well has not begun hydrocarbon production. More particularly, fluid may be injected into the well and into the formation 119 in block 10, preferably prior to fracturing or other injection of material into the reservoir. However, it is envisioned that fluid may be injected at any time during the completion or production process into the reservoir. In one embodiment, the fluid injection rate may be limited to injection rates/volumes which minimize the creation of any hydraulic fracture length during the test. The fluid may be any suitable fluid such as without limitation, saline fluid, water, potassium chloride fluid, ionic fluid, non-ionic fluid, or combinations thereof. Gaseous fluids could also be used. All embodiments of the method include injection stages generated by discrete shifts or changes in either rate or pressure or both and generate timed cumulative volume and pressure data.

Referring to FIG. 1, in some embodiments, prior to block 10, it is necessary to establish the test correction parameters of the casing before perforation or above the open hole section. In addition to the length and inner diameter, an estimate is needed of the magnitude of the correction factors needed to convert from surface volumes to sandface volumes. One factor of universal concern is the level of weepage of liquid through the casing threads. Ballooning of the casing as the result of internal pressurization will affect the estimation of sandface volumes. Another factor may be heat transfer into the wellbore as cooler fluids are injected, resulting in a thermal expansion. These estimates can be generated by those skilled in the art through calculation, observation of the mechanical integrity test of the well to be tested, inference based on performance of offset wells of similar construction, or engineering judgment.

Still referring to FIG. 1 in block 12, fluid such as a water phase is injected with a low flow rate in to the gas reservoir. Examples of methods to inject the fluid include the constant pressure injection test (CPIT) or constant rate injection test (CRIT) in which fluid may be pumped in or in falling fluid level tests (FFLT) fluid flows in to the reservoir due to weight of hydrostatic pressure, i.e., where hydrostatic pressure is higher than reservoir pressure. Further examples of injection test are described in more detail below. The initial or first injection rate is dependent on reservoir properties (e.g. permeability, reservoir pressure) and wellbore completion design (e.g. casing inner diameter, perforation height). For example, results from a reservoir simulation study utilizing the CPIT method for a three day injection test (i.e., two days for baseline and one day calibration), results determined by reservoir simulation studies shows that for a reservoir with 0.01 md, perforation height of 30', 20 shots per foot and 4000 psig reservoir pressure injection rates may range from 0.12 bbls/day to about 3.6 bbls/day for injection pressures ranges of 4500 to 5500 psig. Time periods for these types of injection test depend on permeability and other specifics to the particular well being tested. Volume and pressure data is recorded over a time period in block 12.

Now referring to FIG. 1, the injection rate and/or pressure may then be changed to a different injection rate or injection pressure in block 13 to obtain a calibration data set in block 15. A calibration dataset is acquired in the FFLT embodiment by refilling the casing with a different volume of fluid.

Still referring to FIG. 1, the data collection in 15 can be completed at this point without gathering data for a supercharging correction. If a supercharging correction is desired, return to block 13 to generate another calibration data set. The prior calibration data set serves as the baseline data set for this pair. As many pairs of baseline/calibration data may be gathered as desired, but at least 2 calibration datasets (3 stages) may be used for the supercharging correction and alternatively, more than 4 calibration datasets (5 total stages) may be used.

Still referring to FIG. 1, in 16, once the field data is collected, the datasets may be corrected to sandface conditions. The baseline/calibration analysis is based on the cumulative volume, rate and pressure at the sandface. The various test methods may not directly observe these values and it may be necessary to correct the observation to sandface conditions. All the volume or flow measurements are subject to correction for temperature and pressure, for thread weepage and, thermal changes in the wellbore during the test, among others. Generally, these corrections are established by a number of special mechanical integrity tests on the uncompleted casing. All the pressure measurements are subject to correction for depth; for instance, a surface pressure observation is corrected to the sandface datum by the true vertical depth and the fluid gradient. In cases such as recompletions where tubing and packer systems are utilized, mechanical integrity testing of those systems would be appropriate prior to performing the injection test.

On volumetric or flowrate data, corrections may include but are not limited to the effects of temperature and pressure, the weepage rate of the casing, the ballooning effect of the casing, the thermal expansion driven by the introduction of cooler fluids into a hotter geothermal gradient, and any other effects peculiar to the particular well construction. On pressure data, the bottom hole pressure at the sandface may be calculated using the difference in true vertical depth between the measurement gauge and the sandface and the fluid gradient established by reference, experience or experimentation.

Still referring to FIG. 1, in block 18, once pairs of baseline and calibration volume and pressure dataset are corrected to sandface conditions are available, analysis of the data can be done as described below.

Without being limited by theory, the principle behind the analysis is based upon Darcy's equation. Darcy's equation for radial flow is shown below:

$$q = \frac{2\pi k h}{\mu} \frac{P_{bh} - P_{res}}{\ln\left(\frac{r_e}{r_w}\right) + S}$$

Where q is the volumetric flow rate, μ is the dynamic viscosity, $P_{bh}$ is measured bottom hole pressure, $P_{res}$ is the reservoir pressure, $r_e$ is the radius of invasion, $r_w$ is the wellbore radius, h is perforation height, k is reservoir permeability, and S is a skin factor.

Darcy's radial flow equation may be re-arranged as follows:

$$\ln\left(\frac{r_e}{r_w}\right) = \frac{2\pi k h}{\mu} \frac{P_{bh} - P_{res}}{q} - S$$

Assuming radial flow has been achieved, plotting ln(re/rw) vs ΔP/q will yield a straight line with slope of 2πkh/μ and y intercept of −S. Due to varying flow regimes and other factors straight lines may or may not be observed when plotting actual test data. Findings from field tests and numerical modeling efforts have shown that achieving radial flow to establish straight line relationships may not have to be used to determine reasonable estimates of reservoir pressure using the proposed injection test method. The basic reason behind this is that variations in estimates of reservoir pressure when performing the iteration process provides enough distinction even with relative small variations to establish observable trends and analyzable movements between injective relationship (i.e., $\Delta P/q$) at each injection stage. This sensitivity to reservoir pressure allows for the ability to match $\Delta P/q$ relationships within each stage where trends can be used instead of straight lines, if needed. In another embodiment of the analysis, re/rw can be generally represented by the cumulative volume injected. This approximation may be applied since most of the terms related to re/rw are constant with the exception of the cumulative fluid injected. The volume injected (Wi) can be expressed volumetrically as $Wi=\emptyset(1-Sw\,irr)h\pi(re^2-rw^2)/Bw$, where all of these terms are relatively constant with the exception of re. Therefore re is proportional to Wi. The wellbore radius is rw and is considered to be constant, thus ln(Wi) can be used as a surrogate for ln(re/rw).

An initial guess of the reservoir pressure is made in block 17. The lognormal of the cumulative fluid injection (ln(Qi)) versus pressure drop divided by flow rate ($\Delta P/q$) is then plotted in block 18. $\Delta P$ is the injection pressure at the sandface minus the assumed or estimated reservoir pressure.

Figure 5:
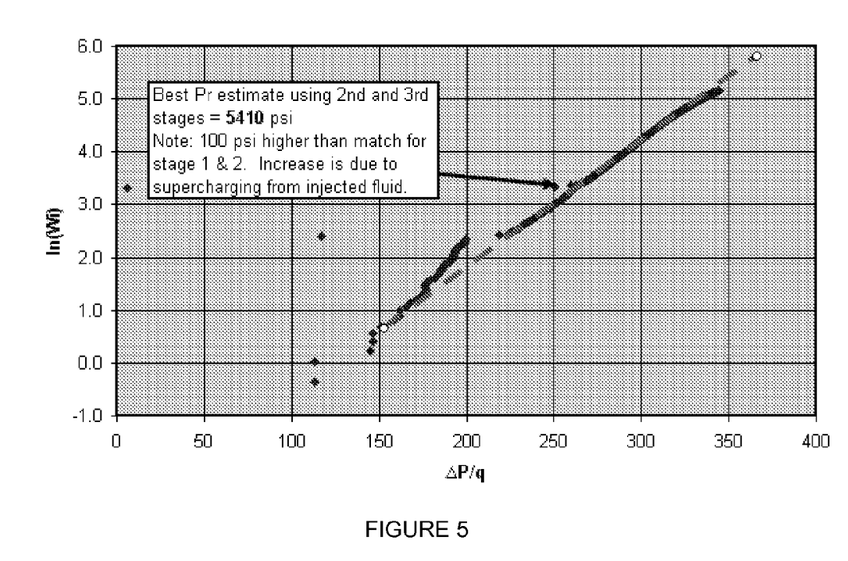
FIG. 5 illustrates an example of a plot of a baseline curve and a calibration curve where the estimated reservoir pressure value is correct including incorporation of the optional method to correct for supercharging.

If the estimation (guess) of reservoir pressure is correct, then the baseline and calibration trends, plots, or curve will match or be aligned. See FIG. 5. If the assumed reservoir pressure is too high, the baseline trend will be to the left of the calibration trend and the estimate should be lowered. Conversely, if the assumed pressure is too low, the baseline trend will be to the right of the calibration trend. Estimates of reservoir pressure are repeated until the trends or curves are matched or aligned in block 19. These operations may be performed manually or automatically by a system such as described below and in FIG. 3.

Figure 6A:
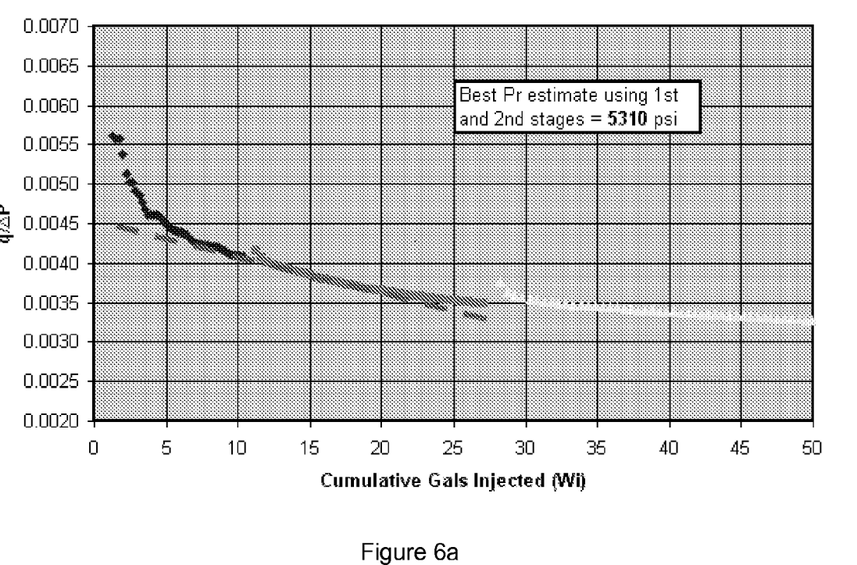
FIGS. 6a and 6b illustrate alternate plotting approaches of the data obtained through the described testing techniques to obtain reservoir pressure.
Figure 6B:
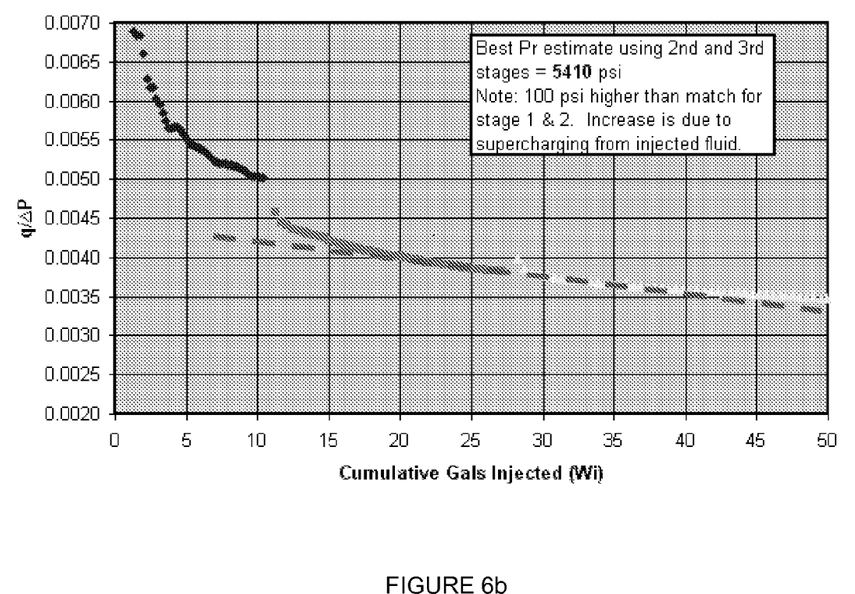

The plotting approach described above allows for a linear relationships between the variables plotted as described by Darcy's radial flow equation, however other variables can be plotted or analyzed to determine reservoir pressure. FIGS. 6a and 6b for example shows two such alternate approaches for data analysis. The first plot shown has flow rates in FIG. 6a is normalized by delta P of injection verses cumulative injection volumes. Offsets between the baseline data and the calibration data in the case over or under estimation of the reservoir pressure are observed, thus still allowing for determination of reservoir pressure. The second plot in FIG. 6b has natural log of $r_e/r_w$ versus delta pressure over rate. This is similar to the plotting method shown in FIG. 5.

The method relies on the observation, both from actual field data as well as numerical simulation, that the value at which the baseline and calibration trends match is approximately the current pressure in the reservoir near the wellbore. The analysis is completed by plotting sandface pressure and rate data in a specialized form from terms arranged in Darcy's flow equation. A reservoir pressure is assumed, and the baseline and calibration trends are examined for a match. If the baseline trend is left of the calibration trend, the assumed pressure is too high and the next estimate should be lower. If the baseline trend is right of the calibration trend, the estimate should be higher. Accurate estimates of the reservoir pressure are obtained in a few iterations. Darcy's equation for radial flow has been primarily used for this method, however other forms of Darcy's equations may be considered for better matches depending on the geometry, for example spherical around perforations, radial around open hole completions, and linear for fractures, among others. As cumulative injection progresses during a test protocol, it is possible that the flow regime will change, and from a practical standpoint, the volume of rock being sensed may change. Thus, the method can still be used to determine an approximation of reservoir pressure using Darcy's equation for radial flow during these early non-radial flow periods, however the plot will not be a pure linearly relationship. Each pair of stages generated by the test protocol will generate a discrete estimate of the pressure present in the reservoir according to the injectivity matches from one injection stage to the next.

Referring still to FIG. 1, if more than one baseline/calibration pair is collected, a correction may be performed to account for supercharging. Based on observations of both actual field data as well as numerical simulation, it has been observed that the pressure estimate increases with each stage of the test. Since fluids are being injected, the pressure near the sandface is generally increasing; an effect which may be referred to as "supercharging". Minimizing the volume injected into the formation, while still providing sandface volume and pressure values with acceptable signal/noise ratio, may reduce the effect of supercharging. However, in most cases it is advantageous to determine the degree of supercharging present and account for it. For a given test protocol with roughly equivalent stage durations, the degree of supercharging is proportional to the cumulative fluid volume injected during the test. The trend of the discrete pressure estimates from multiple baseline/calibration pairs can be extrapolated back to zero cumulative injection to arrive at the best possible estimate of the reservoir pressure at that point in time. The pressure estimates obtained for each pair may be plotted against the cumulative volume of fluid injected at sandface conditions and will describe an increasing trend demonstrating the magnitude of supercharging. An extrapolation may then be performed to arrive at the final reservoir pressure estimate Pr.

Other methods of accounting for supercharging may entail more classical pressure transient techniques of applying the diffusivity or other methods to more rigorously account for buildup and dissipation of supercharge pressures as they relates to injection and reservoir parameters over time.

Figure 2A:
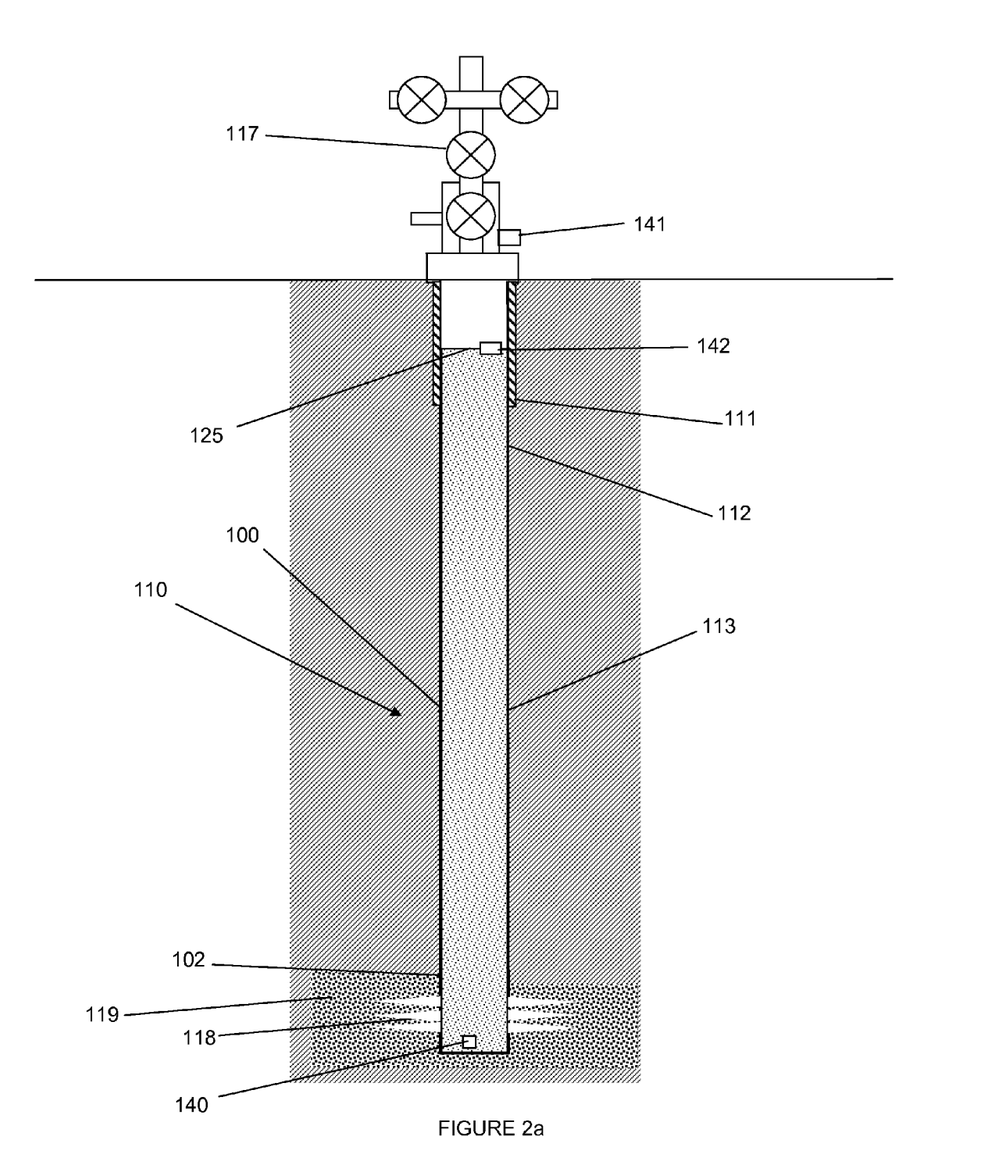
FIG. 2a illustrates a well configured for a falling fluid level test for use with an embodiment of the method.

Any suitable method and/or system may be used to obtain data or information for use with the disclosed reservoir pressure determination methods. More particularly, any suitable method or system may be used to inject the fluid in block 10 and measure rate and/or time in blocks 12 and 15. FIG. 2a illustrates an embodiment of a well for implementing a falling fluid level test (FFLT) for acquiring reservoir pressure data. In the FFLT, the injected fluid at the sandface is calculated by either observing or sensing the level in the tubing (for example, but not limited to an acoustic level sensor) or by using a bottom hole pressure gauge and the density of the fluid to calculate the level. Since the inside diameter of the casing is known the volume of fluid injected over time (e.g. rate) can be determined. In addition, the pressure at the sandface is determined by either direct observation by the bottom hole pressure gauge or by using the level and the density of the fluid to calculate sandface pressure. Stages are generated by adding liquid to the tubing.

FIG. 2a depicts a typical well 110 configured for FFLT. In particular, a well 110 may include without limitation, surface casing 111, production casing 113, and surface valves 117. However, embodiments of the system 100 also may be used in uncased (openhole completed) wells. During injection the fluid level 125 will decrease and fluid will leave the well 110 through perforations 118 and enter the formation 119. FIG. 2a shows a well 110 with a first formation 119. Although the FIGS. 2a-2d do not illustrate production or drilling tubing, it is envisioned that any embodiment of the described methods or systems may be used with wells having production or drilling tubing or without. Other components of a well are not shown and are well known in the art. In embodiments, one or more downhole pressure sensors 140 may be disposed above or below the perforations 118 including a surface location. The pressure sensor 140 may be any device known to those of skill in the art for measuring pressure. For example, the pressure sensors may comprise without limitation, pressure gauges, pressure transducers, pressure transmitters, pressure senders, pressure indicators and piezometers, manometers, or combinations thereof.

In embodiments, one or more level sensors 141 or 142 may be disposed at or above the fluid level in the well. The level sensor 141 or 142 may be any device known to those of skill in the art for measuring level. For example, the level sensors may comprise without limitation, sonic detection, radar detection, capacitance, density, thermal, floats and displacement, or combinations thereof.

In one embodiment, the FFLT method utilizes measurements from pressure sensor 140. In this case, the injected fluid is calculated by observing the change in bottom hole pressure at the gauge over time and using the known density of the fluid to determining the changing fluid level over time. Since the inside diameter of the casing is know the volume of fluid injected over time (e.g. volumetric rate) can be determined.

The FFLT method may also utilize level sensors 141 or 142 (e.g. an acoustic level sensor such as one commercially manufactured by Echometer™, Wichita Falls, Tex.) located at or above the liquid level. In this case, the injected fluid is calculated by observing the change in fluid level over time using the known inner diameter of the casing. The pressure at the sandface is calculated by the known pressure gradient of the fluid in the well.

Figure 2B:
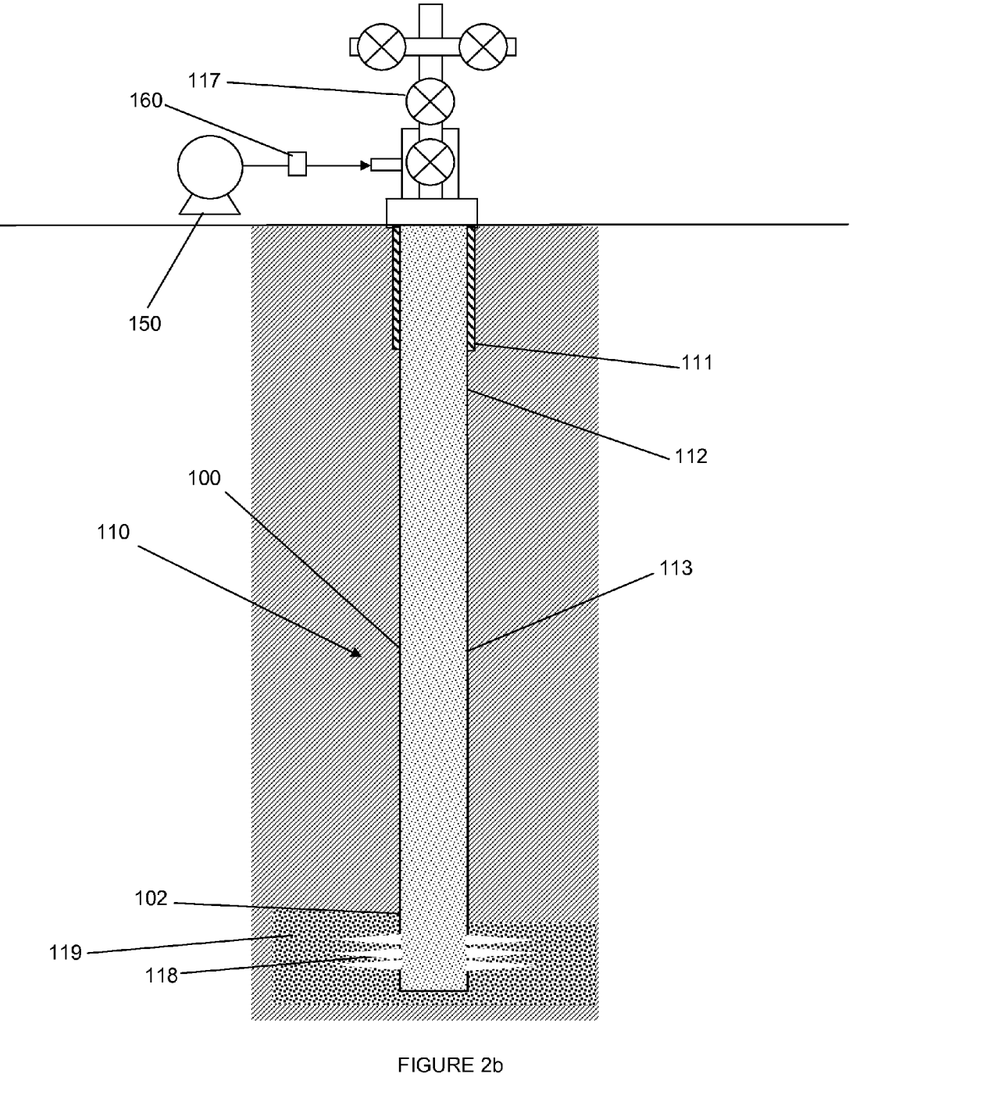
FIG. 2b illustrates a well configured for a constant pressure or constant rate injection test for use with an embodiment of the method.

FIG. 2b illustrates an embodiment of a system for a constant pressure injection test (CPIT) or constant rate injection test (CRIT). CPIT and CRIT methods utilize one or more small surface pumps that are instrumented to accurately measure injected volumes while maintaining constant pressure or accurately measure pressure while maintaining constant volume, respectively. Stages are generated by applying a new setpoint to the controller. The FPT (Falling Pressure Test) is another method of applying this technique. A FPT utilizes the known volume and compressibility within the wellbore in conjunction with changes in surface or bottom-hole measured pressures to calculate fluid volumes entering the reservoir from the wellbore over time. The FPT may be applied in tight and/or over pressured reservoirs where a liquid column can be reasonably maintained during the test. Stages are generated by re-pressurizing the system.

FIG. 2b depicts a typical well 110 configured for the CPIT, CRIT or FPT test. In particular, a well 110 may include without limitation, surface casing 111, production casing 113, and surface valves 117. However, embodiments of the system 100 also may be used in uncased (openhole completed) wells. During injection fluid may leave the well 110 through perforations 118 and enter the formation 119. FIG. 1b shows a well 110 with a first formation 119. Other components of a well are not shown and are well known in the art.

In such an embodiment, fluid may be pumped into the well from the surface using a metering pump 150. All of these methods utilizes one or more small surface pumps 150 that are adapted to accurately measure injected volumes while maintaining either constant pressure or constant rate (e.g., within design specs of pumping system). The surface metering pump 150 may be any suitable pump known to those of skill in the art including without limitation, piston pumps, diaphragm pumps, reciprocating pumps, rotary pumps, progressing cavity pumps, or combinations thereof. Alternatively, it may include use of a non-metering pump 150 and one or more meters 160.

Figure 2C:
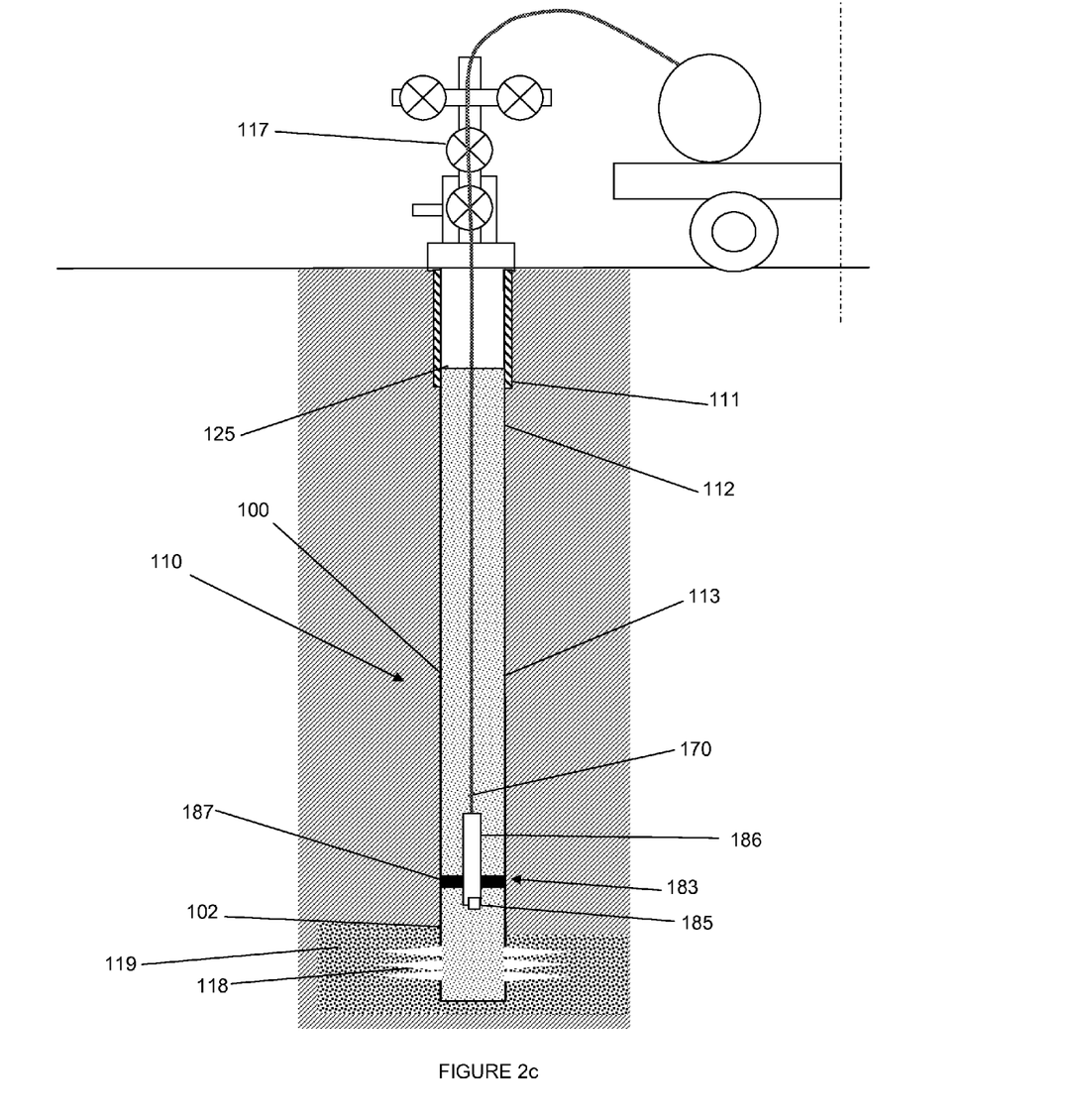
FIG. 2c illustrates a well configured for a wireline deployed injection test for use with an embodiment of the method.

FIG. 2c illustrates an embodiment of the method for a wireline downhole injection test (WDIT). WDIT may be applicable when a low signal/noise ratio is obtained due to the effects of the large casing volume, including but not limited to thread weepage and heat transfer resulting in thermal expansion or contraction. In this test, the downhole pump and pressure gauge are deployed by wireline along with a resettable plug and then either an CPIT, CRIT and/or FPT may be performed. The device could be installed underneath perforating guns. FIG. 2c depicts a typical well 110 configured for a WDIT test. In particular, a well 110 may include without limitation, surface casing 111, production casing 113, and surface valves 117. However, embodiments of the system 100 also may be used in uncased (openhole completed) wells. The downhole assembly 183 is deployed on wireline 170 and set in position above the perforations 118. The downhole pump 186 injects fluid obtained above the plug into the formation 119 while the pressure gauge 185 measures the pressure. FIG. 1c shows a well 110 with a first formation 119. Other components of a well are not shown and are well known in the art.

In another embodiment, referring to FIG. 2c, the corrections necessary to obtain sandface volume and pressure may be reduced by placing the downhole pump 186 and the pressure gauge 185 on a downhole assembly 183 with a resettable packing 187 to seal the casing. The metering pump 186 can then draw fluid from above the downhole assembly 183 and inject it into the formation 119 while recording timed volume with the pressure gauge 185 recording timed pressure. The wireline 170 can be either electric line or slickline; in the case of slickline the downhole assembly 170 includes a power storage device such as batteries and a logic controller. This downhole assembly 183 could be deployed in conjunction with perforating guns to allow immediate testing of a zone upon perforation. The CPIT, CRIT or FPT protocols can then be applied and data with greater signal/noise ratio may be obtained.

Figure 2D:
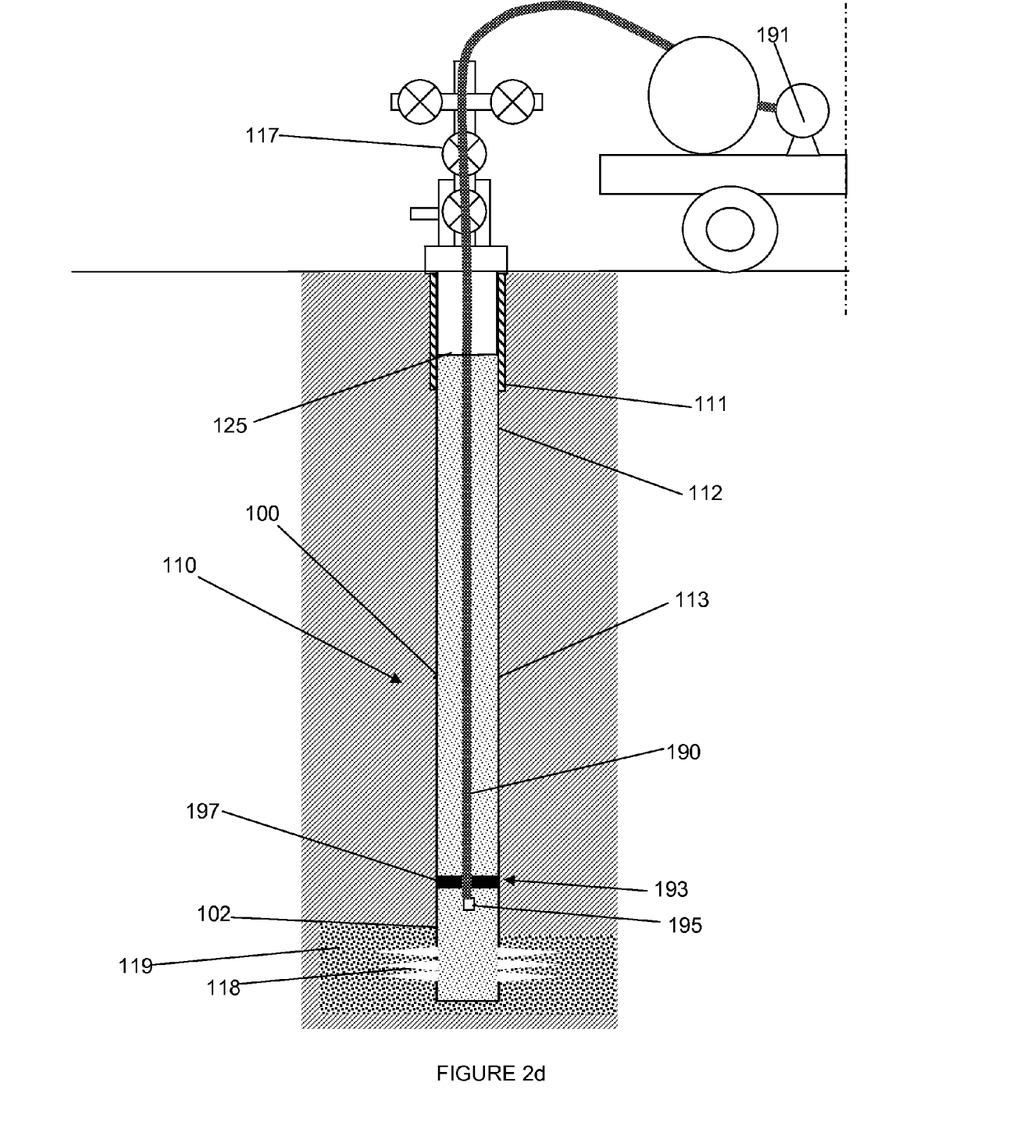
FIG. 2d illustrates a well configured for a coiled tubing deployed injection test for use with an embodiment of the method.

FIG. 2d illustrates an embodiment of the method for a coiled tubing downhole injection test (CDIT). CDIT may be applicable to low signal/noise situations introduced by casing conditions. In this test, the pressure gauge is installed on a resettable packer deployed by coiled tubing with a pressure gauge. Either a CPIT, CRIT and/or FPT is then performed using a surface pump.

FIG. 2d depicts a typical well 110 configured for CDIT. In particular, a well 110 may include without limitation, surface casing 111, production casing 113, and surface valves 117. However, embodiments of the system 100 also may be used in uncased (openhole completed) wells. The downhole assembly 193 is deployed on coiled tubing 190 and set in position above the perforations 118. The surface pump 191 injects fluid into the formation 119 while the pressure gauge 195 measures the pressure. FIG. 1d shows a well 110 with a first formation 119. Other components of a well are not shown and are well known in the art.

Still referring to FIG. 2d, the corrections necessary to obtain sandface volume and pressure may be reduced by using coiled tubing 190 to carry the injected fluid from a surface metering pump 191. The downhole assembly 193, including the pressure gauge 195, can be lowered on coiled tubing 190 and the packing 197 set above the perforations 118 and formation 119 of interest. The CPIT, CRIT or FPT protocols can then be applied and data with greater signal/noise ratio may be obtained.

Figure 3:
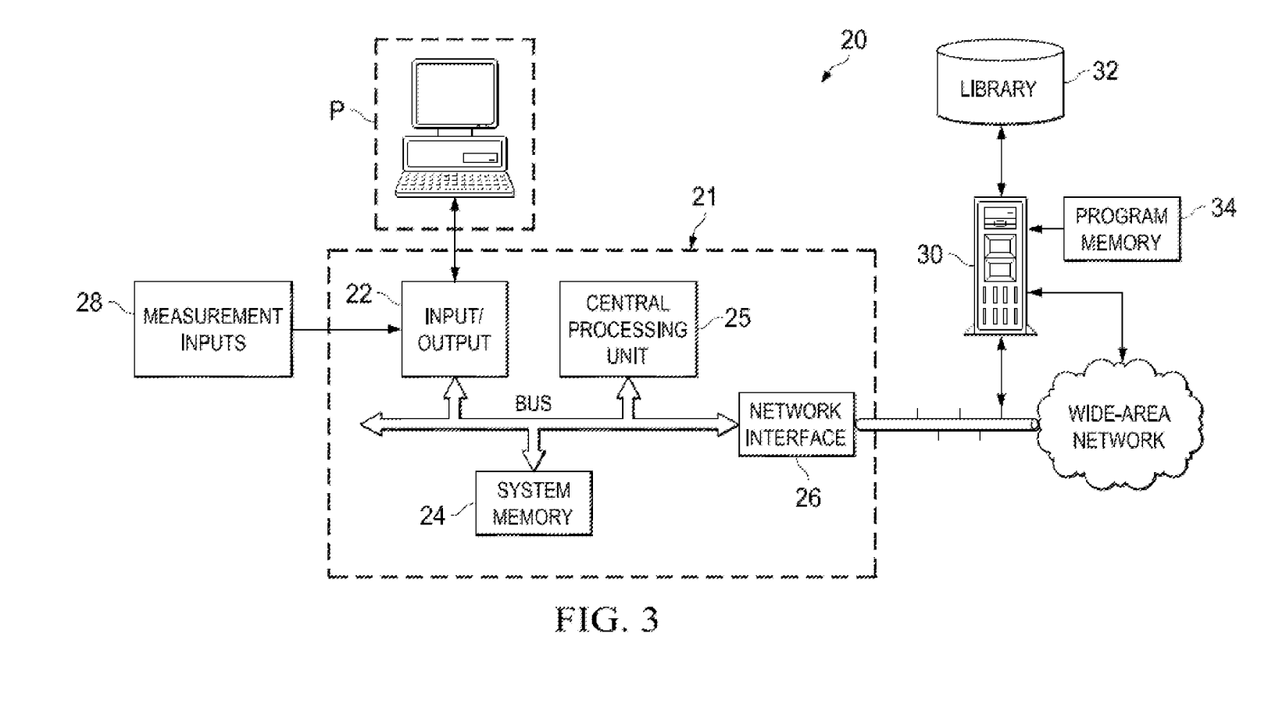
FIG. 3 illustrates a computer system for employing the method.
Figure 4A:
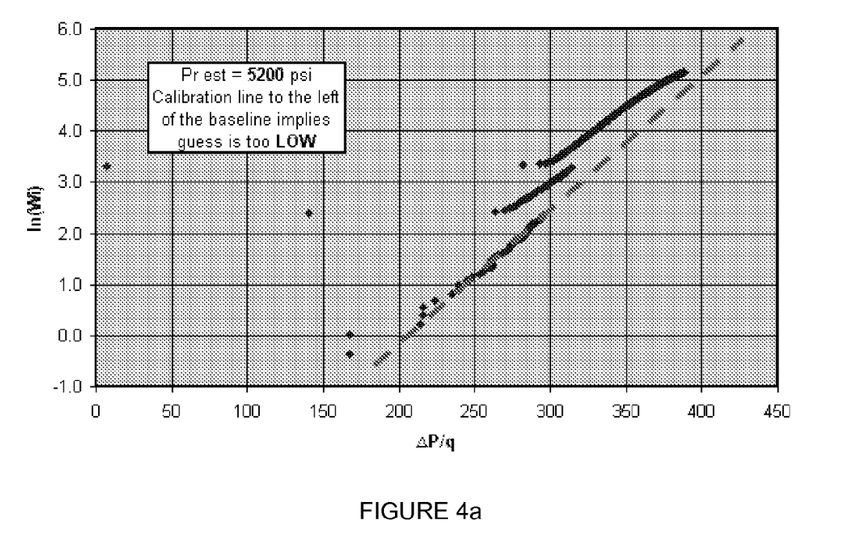
FIG. 4a is an example of a plot of a baseline curve and a calibration curve where the estimated reservoir pressure value is too low.
Figure 4B:
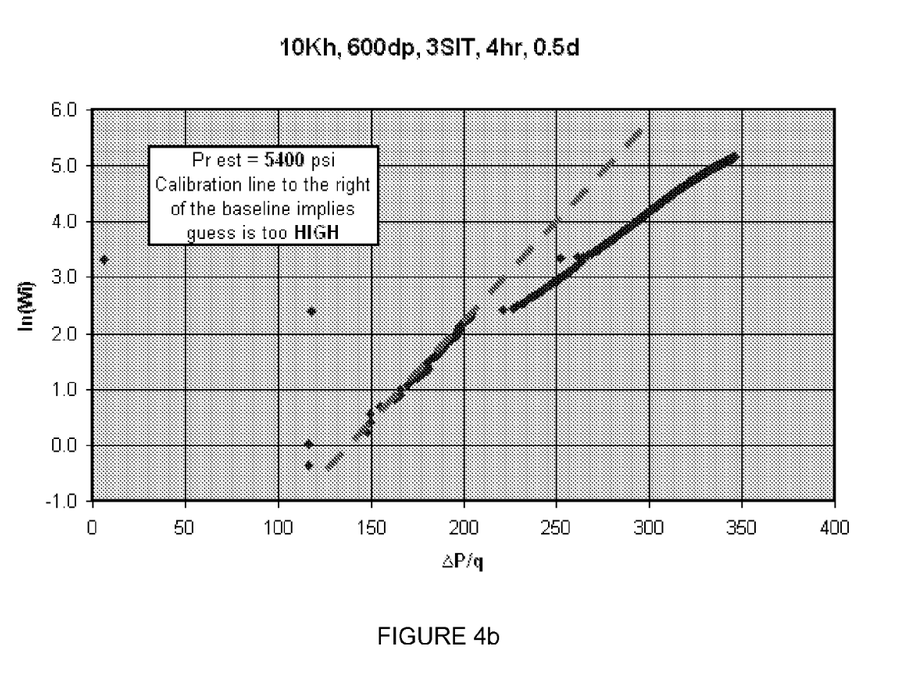
FIG. 4b is an example of a plot of a baseline curve and a calibration curve where the estimated reservoir pressure value is too high.
Figure 4C:
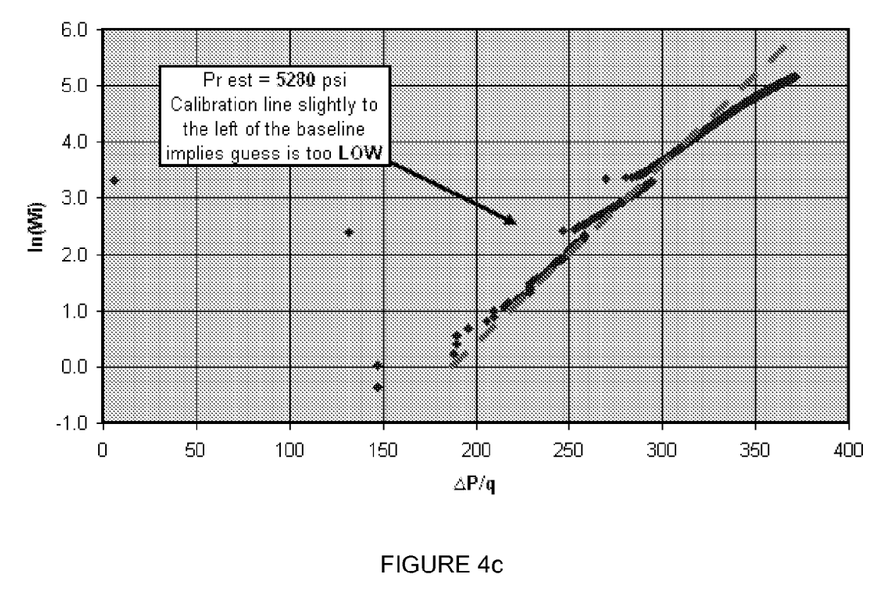
FIG. 4c is an example of a plot of a baseline curve and a calibration curve where the estimated reservoir pressure value is too low.
Figure 4D:
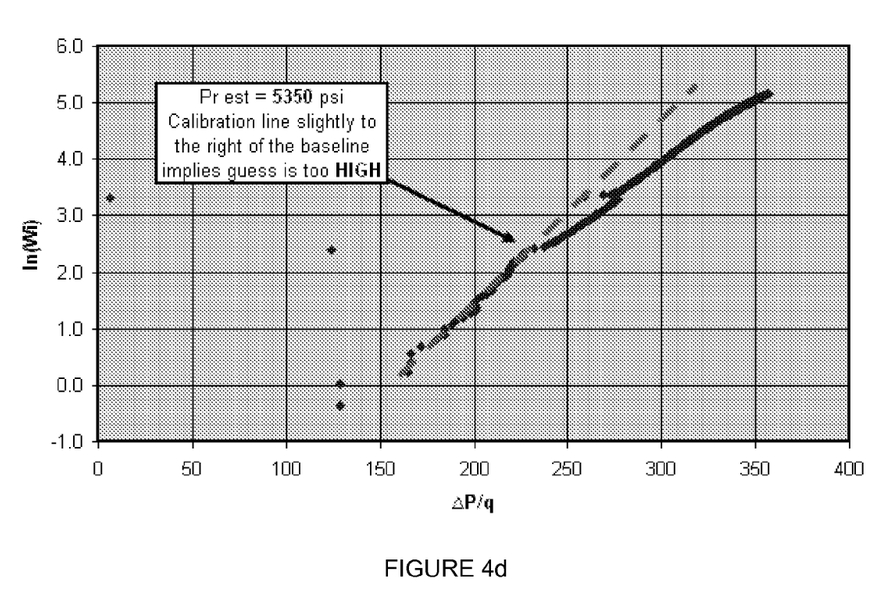
FIG. 4d is an example of a plot of a baseline curve and a calibration curve where the estimated reservoir pressure value is too high.
Figure 4E:
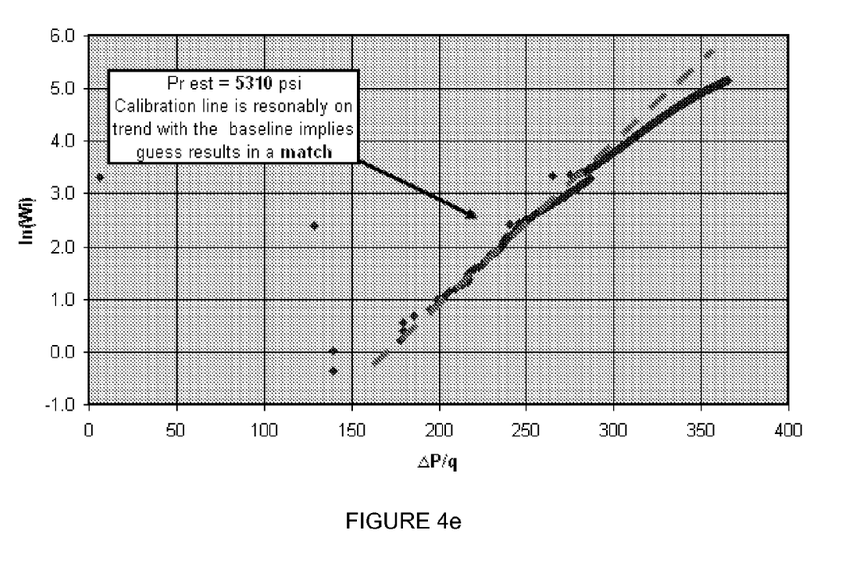
FIG. 4e is an example of a plot of a baseline curve and a calibration curve where the estimated reservoir pressure value is correct.

FIG. 3 illustrates, according to an example of an embodiment computer system 20, which performs the operations described in this specification to analyze and process the pressure date and flow data to determine the reservoir pressure. In this example, system 20 is as realized by way of a computer system including workstation 21 connected to server 30 by way of a network. Of course, the particular architecture and construction of a computer system useful in connection with this invention can vary widely. For example, system 20 may be realized by a single physical computer, such as a conventional workstation or personal computer, or alternatively by a computer system implemented in a distributed manner over multiple physical computers. Accordingly, the generalized architecture illustrated in FIG. 3 is provided merely by way of example.

As shown in FIG. 3 and as mentioned above, system 20 may include workstation 21 and server 30. Workstation 21 includes central processing unit 25, coupled to system bus. Also coupled to system bus BUS is input/output interface 22, which refers to those interface resources by way of which peripheral functions P (e.g., keyboard, mouse, display, etc.) interface with the other constituents of workstation 21. Central processing unit 25 refers to the data processing capability of workstation 21, and as such may be implemented by one or more CPU cores, co-processing circuitry, and the like. The particular construction and capability of central processing unit 25 is selected according to the application needs of workstation 21, such needs including, at a minimum, the carrying out of the functions described in this specification, and also including such other functions as may be executed by computer system. In the architecture of allocation system 20 according to this example, system memory 24 is coupled to system bus BUS, and provides memory resources of the desired type useful as data memory for storing input data and the results of processing executed by central processing unit 25, as well as program memory for storing the computer instructions to be executed by central processing unit 25 in carrying out those functions. Of course, this memory arrangement is only an example, it being understood that system memory 24 may implement such data memory and program memory in separate physical memory resources, or distributed in whole or in part outside of workstation 21. In addition, as shown in FIG. 2, measurement inputs 28 that are acquired from laboratory or field tests and measurements are input via input/output function 22, and stored in a memory resource accessible to workstation 21, either locally or via network interface 26.

Network interface 26 of workstation 21 is a conventional interface or adapter by way of which workstation 21 accesses network resources on a network. As shown in FIG. 2, the network resources to which workstation 21 has access via network interface 26 includes server 30, which resides on a local area network, or a wide-area network such as an intranet, a virtual private network, or over the Internet, and which is accessible to workstation 21 by way of one of those network arrangements and by corresponding wired or wireless (or both) communication facilities. In this embodiment of the invention, server 30 is a computer system, of a conventional architecture similar, in a general sense, to that of workstation 21, and as such includes one or more central processing units, system buses, and memory resources, network interface functions, and the like. According to this embodiment of the invention, server 30 is coupled to program memory 34, which is a computer-readable medium that stores executable computer program instructions, according to which the operations described in this specification are carried out by allocation system 30. In this embodiment of the invention, these computer program instructions are executed by server 30, for example in the form of a "web-based" application, upon input data communicated from workstation 21, to create output data and results that are communicated to workstation 21 for display or output by peripherals P in a form useful to the human user of workstation 21. In addition, library 32 is also available to server 30 (and perhaps workstation 21 over the local area or wide area network), and stores such archival or reference information as may be useful in allocation system 20. Library 32 may reside on another local area network, or alternatively be accessible via the Internet or some other wide area network. It is contemplated that library 32 may also be accessible to other associated computers in the overall network.

Of course, the particular memory resource or location at which the measurements, library 32, and program memory 34 physically reside can be implemented in various locations accessible to allocation system 20. For example, these data and program instructions may be stored in local memory resources within workstation 21, within server 30, or in network-accessible memory resources to these functions. In addition, each of these data and program memory resources can itself be distributed among multiple locations. It is contemplated that those skilled in the art will be readily able to implement the storage and retrieval of the applicable measurements, models, and other information useful in connection with this embodiment of the invention, in a suitable manner for each particular application.

According to this embodiment, by way of example, system memory 24 and program memory 34 store computer instructions executable by central processing unit 25 and server 30, respectively, to carry out the functions described in this specification, by way of which an estimate of the allocation of gas production among multiple formations can be generated. These computer instructions may be in the form of one or more executable programs, or in the form of source code or higher-level code from which one or more executable programs are derived, assembled, interpreted or compiled. Any one of a number of computer languages or protocols may be used, depending on the manner in which the desired operations are to be carried out. For example, these computer instructions may be written in a conventional high level language, either as a conventional linear computer program or arranged for execution in an object-oriented manner. These instructions may also be embedded within a higher-level application. For example, an executable web-based application can reside at program memory 34, accessible to server 30 and client computer systems such as workstation 21, receive inputs from the client system in the form of a spreadsheet, execute algorithms modules at a web server, and provide output to the client system in some convenient display or printed form. It is contemplated that those skilled in the art having reference to this description will be readily able to realize, without undue experimentation, this embodiment of the invention in a suitable manner for the desired installations. Alternatively, these computer-executable software instructions may be resident elsewhere on the local area network or wide area network, or downloadable from higher-level servers or locations, by way of encoded information on an electromagnetic carrier signal via some network interface or input/output device. The computer-executable software instructions may have originally been stored on a removable or other non-volatile computer-readable storage medium (e.g., a DVD disk, flash memory, or the like), or downloadable as encoded information on an electromagnetic carrier signal, in the form of a software package from which the computer-executable software instructions were installed by allocation system 20 in the conventional manner for software installation.

In general, embodiments of the methods may be performed before any significant injection or withdrawal of fluids in order to reduce the scale of supercharging. Consequently, the method may be applied to newly drilled wells before any pumping or stimulation activity. However, in low permeability reservoirs such as shales the test method may be performed post hydraulic fracture or after creating a hydraulic fracture as part of the testing procedure to increase the reservoir area contacted. A hydraulic fracture (i.e., formation breakdown) may also be performed if due to damage or other reasons the perforations or open hole section is not properly connected to the main reservoir interval that desired to be tested. In such embodiments, providing adequate relaxation time to allow the effect of supercharging to dissipate maybe necessary and/or performing three or more injection test periods to collect data needed to correct for supercharging. In some cases where reservoir fluid has entered the wellbore prior to the injection test depletion may need to be corrected for and/or sufficient time allowed prior to the injection test to allow for the reservoir to local recharge near the wellbore region.

It is possible that a number of other reservoir properties can be estimated using the same baseline and calibration trends determined by the disclosed method, including permeability-height and water relative permeability endpoint, among others. Permeability-height is related to the slope of the baseline and calibration trends. The permeability relationships determined from these injection tests are related to the fluid being injected. Where the injected fluid is water, permeability to water or Kw is inferred. If fluid saturations within the sampled region or either known or can be reasonably assumed, there is the possibility that the water relative permeability endpoint can be extracted from the injection test data. This combined with data and analysis from currently used injection testing methods (e.g., Diagnostic Fracture Injection Test (DFIT), Mini Fall-off (MFO), Injection Fall-off Test (IFoT) where relative permeability to gas might be determined could result in endpoints for relative permeability curve estimates. Operationally, these currently used injection testing methods would be executed after the baseline/calibration test protocol described in this document. As an example, a CPIT could be conducted followed by an IFoT. The advantages would be to obtain independent estimates of reservoir pressure and possibly an improved understanding of reservoir relative permeability. Obtaining meaningful data from the IFoT requires reaching the pseudo radial flow period and could also require the running of a downhole pressure gauge both of which could cause unacceptable operational delays. Therefore, while desirable to run both types of test operational limitations may prohibit running the IFoT. Advantages of the CPIT vs. the IFoT would include potentially requiring less time, being more economical and not requiring the running of any downhole equipment thus reducing operational risk.

While the embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

The discussion of a reference is not an admission that it is prior art to the present invention, especially any reference that may have a publication date after the priority date of this application. The disclosures of all patents, patent applications, and publications cited herein are hereby incorporated herein by reference in their entirety, to the extent that they provide exemplary, procedural, or other details supplementary to those set forth herein.

What is claimed is:

1. A method of determining reservoir pressure from a reservoir:
    (a) injecting, by a PUMP, a fluid into a well drilled into the reservoir;
    (b) measuring, by one or more sensors, one or more parameters indicative of reservoir pressure over a period time to form a baseline dataset, wherein the one or more parameters include at least bottom hole pressure and volumetric flow rate;
    (c) inducing, via the PUMP, a change in an injection rate or injection pressure of the fluid;
    (d) measuring, by the one or more sensors, the one or more parameters indicative of reservoir pressure for at least a second period of time to form a calibration dataset;
    (e) estimating, by the one or more processors, a reservoir pressure value, wherein estimating further comprises plotting the baseline dataset and the calibration datasets based upon the following equation:

$$\ln\left(\frac{r_e}{r_w}\right) = \frac{2\pi kh}{\mu}\frac{P_{bh} - P_{res}}{q} - S$$

where q is the volumetric flow rate, $\mu$ is the dynamic viscosity, $P_{bh}$ is measured bottom hole pressure, $P_{res}$ is the reservoir pressure, $r_e$ is the radius of invasion, $r_w$ is the wellbore radius, h is perforation height, k is reservoir permeability, and S is a skin factor;
    (f) plotting, by the one or more processors, fluid injection volume versus a ratio of pressure change to flow rate for the baseline dataset and the calibration datasets to form a baseline curve and calibration curve based upon the reservoir pressure value;
    (g) comparing, by the one or more processors, the baseline curve and the calibration curve to determine if the reservoir pressure value is correct; and
    (h) if the baseline curve and the calibration curve are not aligned, then repeating (e) through (g) until the baseline curve and the calibration curve are aligned.

2. The method of claim 1 wherein the fluid comprises water.

3. The method of claim 1 wherein (b) and (d) comprise using a pressure sensor disposed below perforations in a well to measure the one or more parameters.

4. The method of claim 1 wherein (a) through (d) are performed prior to fracturing.

5. The method of claim 1, further comprising correcting the baseline dataset and the calibration datasets for a plurality of sandface conditions.

6. The method of claim 1, further comprising repeating (c) and (d) to form additional calibration datasets.

7. The method of claim 6, further comprising using the additional calibration datasets to correct for supercharging.

8. The method of claim 1 wherein (b) and (d) comprise:
(b1) shutting in the well;
(b2) allowing the fluid to flow into the reservoir; and
(b3) measuring the bottom hole pressure and the flow rate.

9. The method of claim 1 wherein measuring the one or more parameters in (b) and (d) comprises using the one or more sensors to measure a fluid level within the well.

10. The method of claim 1, wherein (c) comprises re-injecting a volume of fluid.

11. The method of claim 1, wherein (a) comprises using the pump to inject the fluid into the well at a constant pressure or a constant flow rate.

12. The method of claim 11 wherein the pump comprises a surface pump.

13. The method of claim 12 further comprising injecting the fluid through coiled tubing from the surface pump.

14. The method of claim 11 wherein the pump comprises a downhole pump.

15. The method of claim 14 wherein the downhole pump is deployed on wireline.

16. A system, comprising:
one or more sensors positioned to measure one or more parameters indicative of reservoir pressure from a hydrocarbon producing reservoir, wherein the one or more parameters include at least bottom hole pressure and volumetric flow rate;
an interface coupled to one or more sensors for receiving the one or more parameters from the one or more sensors;
a memory resource;
input and output functions for presenting and receiving communication signals to and from a human user;
one or more central processing units for executing program instructions; and
program memory, coupled to the central processing unit, for storing a computer program including program instructions that, when executed by the one or more central processing units, cause the computer system to perform a plurality of operations for determining reservoir pressure, the plurality of operations comprising:
a) forming a baseline dataset based on the one or more parameters;
b) forming one or more calibration datasets based on the one or more parameters;
c) estimating a reservoir pressure value;
d) plotting fluid injection volume versus a ratio of pressure change to flow rate for the baseline dataset and the calibration datasets to form a baseline curve and calibration curve based upon the reservoir pressure value, wherein plotting further comprises plotting the baseline dataset and the calibration datasets based upon the following equation:

$$\ln\left(\frac{r_e}{r_w}\right) = \frac{2\pi k h}{\mu} \frac{P_{bh} - P_{res}}{q} - S$$

where q is the volumetric flow rate, μ is the dynamic viscosity, $P_{bh}$ is measured bottom hole pressure, $P_{res}$ is the reservoir pressure, $r_e$ is the radius of invasion, $r_w$ is the wellbore radius, h is perforation height, k is reservoir permeability, and S is a skin factor;
e) comparing the baseline curve and the calibration curve to determine if the reservoir pressure value is correct;
f) if the baseline curve and the calibration curve are not aligned, then repeating (c) through (e) until the baseline curve and the calibration curve are aligned.

17. The system of claim 16, further comprising a pump for injecting a fluid into a well drilled into the reservoir.

18. The system of claim 17 wherein the pump is a surface pump.

19. The system of claim 18, further comprising a length of coiled tubing coupled to the surface pump and running into the well.

20. The system of claim 17 wherein the pump is a downhole pump.

21. The system of claim 20 wherein the downhole pump is deployed on wireline.

22. The system of claim 16 wherein the sensors are pressure sensors, acoustic sensors, fluid level sensors, or combinations thereof.

* * * * *